(12) United States Patent
Yang et al.

(10) Patent No.: US 9,680,690 B2
(45) Date of Patent: Jun. 13, 2017

(54) METHOD, NETWORK ADAPTER, HOST SYSTEM, AND NETWORK DEVICE FOR IMPLEMENTING NETWORK ADAPTER OFFLOAD FUNCTION

(71) Applicant: Huawei Technologies Co., Ltd., Shenzhen (CN)

(72) Inventors: Xiaohua Yang, Shenzhen (CN); Fuqing Sun, Nanjing (CN); Yungui Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 432 days.

(21) Appl. No.: 14/292,096

(22) Filed: May 30, 2014

(65) Prior Publication Data

US 2014/0280857 A1    Sep. 18, 2014

Related U.S. Application Data

(63) Continuation of application No. PCT/CN2012/074628, filed on Apr. 25, 2012.

(30) Foreign Application Priority Data

Nov. 30, 2011 (CN) .......................... 2011 1 0389265

(51) Int. Cl.
*H04L 12/24* (2006.01)
*H04L 29/08* (2006.01)
(Continued)

(52) U.S. Cl.
CPC .............. *H04L 41/00* (2013.01); *H04L 67/30* (2013.01); *H04L 69/22* (2013.01); *H04W 4/003* (2013.01)

(58) Field of Classification Search
CPC . H04L 47/2441; H04L 63/0263; H04L 69/22; H04L 63/0227; H04L 63/1408;
(Continued)

(56) References Cited

U.S. PATENT DOCUMENTS 6,876,654 B1 * 4/2005 Hegde ................. H04L 12/4625
370/392
7,860,097 B1   12/2010 Lovett et al.
(Continued)

FOREIGN PATENT DOCUMENTS

CN   101212314 A   7/2008
CN   102014065 A   4/2011
(Continued)

OTHER PUBLICATIONS

"Design and Implementation of Protocol Identification Based on N-Code Frame," TP311.52, May 31, 2010, 8 pages.
(Continued)

*Primary Examiner* — Ruolei Zong
(74) *Attorney, Agent, or Firm* — Conley Rose, P.C.

(57) ABSTRACT

A method, a network adapter, a host system, and a network device for implementing a network adapter offload function. If a data packet received by the network adapter or the host system is a data packet unknown to the network adapter, the data packet unknown to the network adapter is parsed, a new policy entry is generated, and the new policy entry is updated into the host policy table and the network adapter policy table. Therefore, for a packet that includes a new proprietary or standard protocol header Tag, only a functional module that parses the packet needs to be updated, so that the functional module is capable of processing such a packet and delivering a new policy entry to the host policy table and the network adapter policy table and the network adapter does not need to be changed.

20 Claims, 3 Drawing Sheets

(51) Int. Cl.
*H04W 4/00* (2009.01)
*H04L 29/06* (2006.01)

(58) Field of Classification Search
CPC ......... H04L 45/38; H04L 41/00; H04L 43/16; H04L 49/70
USPC ........................................................ 709/223
See application file for complete search history.

(56) References Cited

U.S. PATENT DOCUMENTS

| | | | |
|---|---|---|---|
| 2003/0123452 A1* | 7/2003 | Cox | H04L 45/7457 370/395.43 |
| 2007/0022212 A1 | 1/2007 | Fan | |
| 2007/0030803 A1* | 2/2007 | Gooch | H04L 47/2433 370/230 |
| 2007/0294360 A1* | 12/2007 | Ebling | A61B 5/14532 709/208 |
| 2008/0212586 A1* | 9/2008 | Wang | H04L 45/00 370/392 |
| 2009/0316711 A1* | 12/2009 | Memon | H04L 47/10 370/412 |
| 2012/0314584 A1 | 12/2012 | Su | |
| 2013/0195117 A1 | 8/2013 | Chen et al. | |

FOREIGN PATENT DOCUMENTS

| | | |
|---|---|---|
| CN | 102045247 A | 5/2011 |
| CN | 102143148 A | 8/2011 |
| CN | 102217281 A | 10/2011 |

OTHER PUBLICATIONS

English Translation of Zhang, X., et al., "Research and Implementation of the Protocol identified n-cord-based framework," Dec. 15, 2010, 2 pages.
Foreign Communication From a Counterpart Application, Chinese Application No. 201110389265.1, Chinese Office Action dated Apr. 1, 2015, 7 pages.
Foreign Communication From a Counterpart Application, PCT Application No. PCT/CN2012/074628, English Translation of International Search Report dated Aug. 30, 2012, 2 pages.
Foreign Communication From a Counterpart Application, PCT Application No. PCT/CN2012/074628, English Translation of Written Opinion dated Aug. 30, 2012, 9 pages.
Foreign Communication From a Counterpart Application, European Application No. 12853441.9, Extended European Search Report dated Nov. 11, 2014, 6 pages.

* cited by examiner

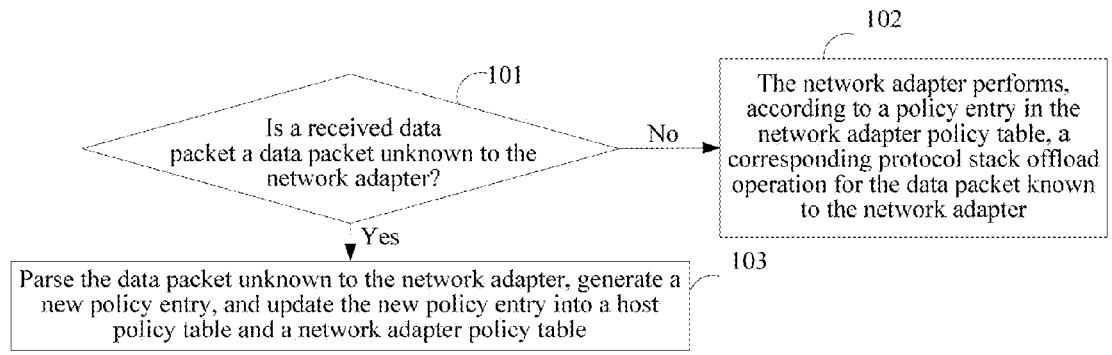
FIG. 1
Policy table
| Type | Action |
|------|--------|
| 8100 | Start=xx, offset=xx... |
| 0800 | Start=xx, offset=xx... |
| ... | ... |
FIG. 2
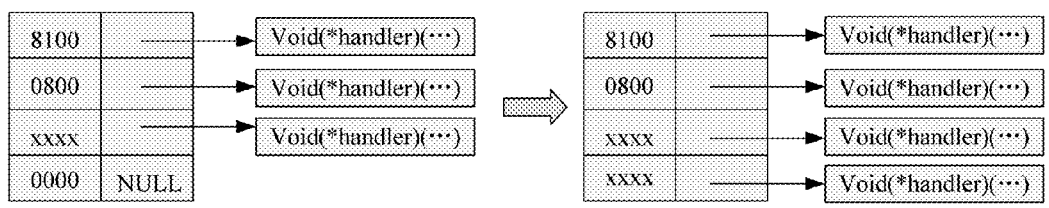
FIG. 3

METHOD, NETWORK ADAPTER, HOST SYSTEM, AND NETWORK DEVICE FOR IMPLEMENTING NETWORK ADAPTER OFFLOAD FUNCTION

CROSS-REFERENCE TO RELATED APPLICATIONS

This application is a continuation of International Application No. PCT/CN2012/074628, filed on Apr. 25, 2012, which claims priority to Chinese Patent Application No. 201110389265.1, filed on Nov. 30, 2011, both of which are hereby incorporated by reference in their entireties.

TECHNICAL FIELD

The present invention relates to the field of communications technologies, and in particular, to a method, a network adapter, a host system, and a network device for implementing a network adapter offload function.

BACKGROUND

With the rapid development of an Internet service, network video traffic increases dramatically, and a server virtualization technology is more widely used in a data center to make full use of hardware resources. In this situation, usage of central processing unit (CPU) resources in transport control protocol (TCP)/Internet Protocol (IP) network protocol stack processing is getting higher and higher, which may even become a bottleneck of an entire server system. To reduce a CPU load and further improve the performance of the entire server system, network adapter manufacturers launch network adapters with an offload function in succession to reduce the usage of CPU resources in TCP/IP protocol stack processing by offloading partial work (such as TCP/IP checksum calculation and TCP/user datagram protocol (UDP) packet segmentation) of which a TCP/IP protocol stack originally takes charge to a network adapter for processing.

Currently, offload functions provided by a network adapter generally include TCP/IP checksum calculation, TCP/UDP fragmented packet reassembly, TCP segmentation offload, and the like, and all these offload functions depend on whether the network adapter is capable of correctly parsing a packet to be processed. Generally, the network adapter can support processing of a standard data packet, for example, a standard IP packet and an IP packet with a virtual local area network (VLAN) identifier. However, in a server virtualization situation, a proprietary protocol tag (Tag) is generally encapsulated in a packet to isolate network traffic. For an IP packet that includes the proprietary protocol Tag, the network adapter cannot correctly parse such an IP packet, which results in various offload misoperations. As a result, a large number of packets are lost in a network, and network transmission performance is affected.

In the prior art, a customized network adapter is used to provide a network adapter offload function for a specific proprietary protocol. However, a solution of customizing the network adapter features a poor scalability, and a lot of CPU resources still need to be occupied to process an IP packet of an unknown protocol.

SUMMARY

Embodiments of the present invention provide a method, a network adapter, a host system, and a network device for implementing a network adapter offload function to solve the problem of a poor scalability of the network adapter offload function in the prior art.

According to one aspect, a method for implementing a network adapter offload function is provided, including: determining, according to a network adapter policy table stored in a network adapter or a host policy table stored in a host system, a received data packet is a data packet known to the network adapter or a data packet unknown to the network adapter; if the data packet is a data packet known to the network adapter, performing, by the network adapter according to a policy entry in the network adapter policy table, a corresponding protocol stack offload operation for the data packet known to the network adapter; and if the data packet is a data packet unknown to the network adapter, parsing the data packet unknown to the network adapter, generating a new policy entry, and updating the new policy entry into the host policy table and the network adapter policy table.

According to another aspect, a network adapter is provided, including: a first determining module configured to determine, according to a network adapter policy table, whether a received data packet is a data packet known to the network adapter or a data packet unknown to the network adapter; a first offloading module configured to perform, if the data packet is a data packet known to the network adapter, a corresponding protocol stack offload operation for the data packet according to the network adapter policy table; an uplink packet sending module configured to send, if the data packet is a data packet unknown to the network adapter, the data packet to a host system, so that the host system parses the data packet and generates a new policy entry; and a first policy updating module configured to receive the new policy entry and update the new policy entry into the network adapter policy table.

According to still another aspect, a host system is provided, including: a second determining module configured to determine, according to a host policy table, whether a received data packet is a data packet known to a network adapter or a data packet unknown to the network adapter; a downlink packet sending module configured to send, if the data packet is a data packet known to the network adapter, the data packet to the network adapter, so that the network adapter performs a corresponding protocol stack offload operation for the data packet according to a policy entry in a network adapter policy table; a packet parsing module configured to parse, if the received data packet is a data packet unknown to the network adapter, the data packet unknown to the network adapter and generate a new policy entry; and a second policy updating module configured to update the new policy entry into the host policy table and send the new policy entry to the network adapter.

According to still another aspect, a network device for implementing a network adapter offload function is provided, including the network adapter described above and the host system described above.

In the embodiments of the present invention, whether a received data packet is a data packet known to a network adapter or a data packet unknown to the network adapter is determined first. If the data packet is a data packet known to the network adapter, the network adapter performs, according to a policy entry in a network adapter policy table, a corresponding protocol stack offload operation for the data packet known to the network adapter. If the data packet is a data packet unknown to the network adapter, the received data packet unknown to the network adapter is parsed, a new policy entry is generated, and the new policy entry is simultaneously updated into a host policy table and the network adapter policy table, so that the network adapter is capable of performing, according to the new policy entry, a corresponding protocol stack offload operation for a subsequently received data packet, where a protocol keyword of the data packet is the same as a protocol keyword of the data packet unknown to the network adapter. According to the present invention, for a data packet that includes a new proprietary or standard protocol header Tag, only a functional module that parses the packet needs to be updated, so that the functional module is capable of processing such a data packet and delivering a new policy entry to the host policy table and the network adapter policy table and the network adapter does not need to be changed, thereby implementing dynamic expansion for a network adapter offload function.

BRIEF DESCRIPTION OF DRAWINGS

FIG. 1 is a flowchart of a method for implementing a network adapter offload function according to an embodiment of the present invention;

FIG. 2 is a schematic structural diagram of a host policy table and a network adapter policy table according to an embodiment of the present invention;

FIG. 3 is a schematic structural diagram of a protocol parsing table according to an embodiment of the present invention;

DESCRIPTION OF EMBODIMENTS

Figure 4:
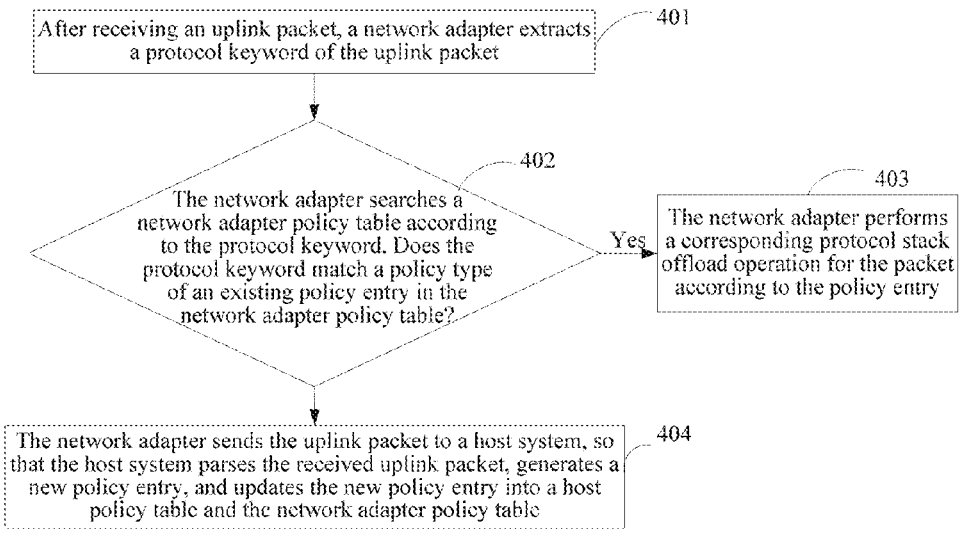
FIG. 4 is a flowchart of a method for implementing a network adapter offload function if a received packet is an uplink packet according to an embodiment of the present invention.

To make the objectives, technical solutions, and advantages of the present invention more comprehensible, the following further describes the present invention in detail with reference to the accompanying drawings and embodiments. It is understood that the specific embodiment is only used to explain the present invention and is not intended to limit the present invention.

In embodiments of the present invention, whether a received data packet is a data packet known to a network adapter or a data packet unknown to the network adapter is determined first. If the data packet is a data packet known to the network adapter, the network adapter performs, according to a policy entry in a network adapter policy table, a corresponding protocol stack offload operation for the data packet known to the network adapter. If the data packet is a data packet unknown to the network adapter, the received data packet unknown to the network adapter is parsed, a new policy entry is generated, and the new policy entry is simultaneously updated into a host policy table and the network adapter policy table, so that the network adapter is capable of performing, according to the new policy entry, a corresponding protocol stack offload operation for a subsequently received data packet, where a protocol keyword of the data packet is the same as a protocol keyword of the data packet unknown to the network adapter. According to the present invention, for a data packet that includes a new proprietary or standard protocol header Tag, only a functional module that parses the data packet needs to be updated, so that the functional module is capable of processing such a data packet and delivering a new policy entry to the host policy table or the network adapter policy table and the network adapter does not need to be changed, thereby implementing dynamic expansion for a network adapter offload function.

FIG. 1 shows a method for implementing a network adapter offload function according to an embodiment of the present invention, and the method may be applied to a network device that includes a host system and a network adapter. The method includes:

101. Determine, according to a network adapter policy table stored in a network adapter or a host policy table stored in a host system, whether a received data packet is a data packet known to the network adapter or a data packet unknown to the network adapter.

In this embodiment of the present invention, the data packet may be an inbound packet, which is also known as an uplink packet; or an outbound packet, which is also known as a downlink packet. If the received data packet is an uplink packet, that is, if the network adapter first receives the data packet, the network adapter determines, according to the network adapter policy table stored in the network adapter, whether the received data packet is a data packet known to the network adapter or a data packet unknown to the network adapter; otherwise, if the received data packet is a downlink packet, that is, if the host system first receives the data packet, the host system determines, according to the host policy table stored in the host system, whether the received data packet is a data packet known to the network adapter or a data packet unknown to the network adapter.

The determining, by the network adapter or the host system, whether the received data packet is a data packet known to the network adapter or a data packet unknown to the network adapter includes:

101a. The network adapter or the host system extracts a protocol keyword of the data packet.

101b. Search the network adapter policy table or the host policy table according to the protocol keyword, where the host policy table and the network adapter policy table include policy entries, and the policy entries include policy types and actions.

101c. If the protocol keyword matches a policy type of an existing policy entry in the host policy table or the network adapter policy table, the data packet is a data packet known to the network adapter; otherwise, the data packet is a data packet unknown to the network adapter.

102. If the data packet is a data packet known to the network adapter, the network adapter performs, according to a policy entry in the network adapter policy table, a corresponding protocol stack offload operation for the data packet known to the network adapter.

If the data packet is an uplink packet, the network adapter performs a corresponding protocol stack offload operation for the uplink packet according to an action in a policy entry corresponding to the protocol keyword and sends the processed data packet to a protocol stack of the host system or a virtual switch (vSwitch) in a virtualization platform for processing.

If the data packet is a downlink packet, the host system sends the data packet to the network adapter, so that the network adapter performs a corresponding protocol stack offload operation for the data packet according to a corresponding policy entry in the network adapter policy table and sends out the data packet.

103. If the data packet is a data packet unknown to the network adapter, parse the data packet unknown to the network adapter, generate a new policy entry, and update the new policy entry into the host policy table and the network adapter policy table.

The network adapter includes a memory, where the memory stores the network adapter policy table, the network adapter policy table includes a policy entry, and the policy entry includes a policy type and an action. The host system stores the host policy table, and a structure of the host policy table is the same as that of the network adapter policy table. A specific structure of the host policy table and the network adapter policy table is shown in FIG. 2.

Specifically, in 103, the host system may parse the received data packet unknown to the network adapter and generate a new policy entry, where the host system stores a protocol parsing table. Alternatively, the host system forwards the received data packet unknown to the network adapter to a remote server, so that the remote server parses the data packet unknown to the network adapter and generates a new policy entry, and the host system receives the new policy entry returned by the remote server, where the remote server stores a protocol parsing table, and the protocol parsing table includes a protocol keyword and a handler of a protocol parsing function. A specific structure of the protocol parsing table is shown in FIG. 3.

The host system updates the new policy entry into the host policy table and the network adapter policy table, so that the network adapter performs, according to the new policy entry, a corresponding protocol stack offload operation for a subsequently received data packet of the same kind, where the data packet of the same kind refers to a data packet whose protocol keyword is the same as the protocol keyword of the data packet unknown to the network adapter.

The parsing the data packet unknown to the network adapter includes:

103a. Extract a protocol keyword of the data packet unknown to the network adapter.

103b. Search the protocol parsing table according to the protocol keyword, where the protocol parsing table includes a protocol keyword and a handler of a protocol parsing function.

103c. If the protocol keyword matches a protocol keyword of a piece of existing protocol parsing information in the protocol parsing table, acquire a handler of a protocol parsing function in the existing protocol parsing information and invoke the protocol parsing function to parse the data packet unknown to the network adapter.

It should be noted that initial policy tables in the host system and the network adapter may be empty, that is, there is no policy entry. As the network adapter continuously receives traffic packets of various protocol types, a local packet parsing module or a remote packet parsing module dynamically expands policy entries in the policy tables in the host system and the network adapter. The policy tables may be maintained by using a passive aging mechanism, that is, a least recently used (LRU) policy entry is overwritten when the number of policy entries exceeds an upper limit, thereby saving storage resources of the network adapter.

According to this embodiment, for a packet that includes a new proprietary or standard protocol header Tag, only a local packet parsing module or a remote packet parsing module needs to be updated, so that the local packet parsing module or the remote packet parsing module is capable of processing such a packet and delivering a new policy entry to a local policy table and a network adapter policy table and the network adapter does not need to be changed, thereby implementing dynamic expansion for the network adapter offload function.

Optionally, to allow the host system or the remote server to parse the received data packet unknown to the network adapter, before step 101, the method further includes: receiving, by the host system or the remote server, an entered new protocol registration command, where the new protocol registration command includes a keyword and an entry that points to a parsing function handler corresponding to the keyword; and updating, by the host system or the remote server, the protocol parsing table according to the new protocol registration command. FIG. 3 shows a protocol parsing table before registration of a new protocol and a protocol parsing table after the registration of the new protocol.

For example, FIG. 4 shows a method for implementing a network adapter offload function if a received packet is an uplink packet according to this embodiment of the present invention. The method includes:

401. After receiving an uplink packet, the network adapter extracts a protocol keyword of the uplink packet.

The protocol keyword of the uplink packet may be a protocol type.

402. The network adapter searches the network adapter policy table according to the protocol keyword, where the network adapter policy table includes the policy entry, and the policy entry includes the policy type; if the protocol keyword matches a policy type of an existing policy entry in the network adapter policy table, the data packet is a data packet known to the network adapter and 403 is performed; otherwise, the data packet is a data packet unknown to the network adapter, and 404 is performed.

After extracting the protocol keyword of the uplink packet, the network adapter searches the network adapter policy table according to the keyword. If the protocol keyword matches a policy type of an existing policy entry in the network adapter policy table, step 403 is performed; otherwise, step 404 is performed.

A specific matching rule is searching a policy type of a policy entry, if a policy type that is the same as the keyword exists in the network adapter policy table, it indicates that a policy entry matching the keyword exists in the network adapter policy table.

403. The network adapter performs a corresponding protocol stack offload operation for the packet according to the policy entry.

If the protocol keyword matches a policy type of an existing policy entry in the network adapter policy table, the network adapter performs a corresponding protocol stack offload operation, such as TCP checksum calculation or generic receive offload (GRO) processing, for the uplink packet according to an action in the policy entry corresponding to the keyword and finally sends the uplink packet to a protocol stack of the host system or the virtual switch (vSwitch) in the virtualization platform for processing.

404. The network adapter sends the uplink packet to the host system, so that the host system parses the received uplink packet, generates a new policy entry, and updates the new policy entry into the host policy table and the network adapter policy table.

If the protocol keyword does not match a policy type of any existing policy entry in the network adapter policy table, the network adapter sends the uplink packet to the host system.

After the host system receives the uplink packet sent by the network adapter, the local packet parsing module of the host system first extracts the protocol keyword of the uplink packet and then searches the protocol parsing table according to the protocol keyword, where the protocol parsing table includes a protocol keyword and a handler of a protocol parsing function. If the protocol keyword matches a protocol keyword of a piece of existing protocol parsing information in the protocol parsing table, the host system acquires a handler of a protocol parsing function in the existing protocol parsing information, invokes the protocol parsing function to parse the data packet unknown to the network adapter, generates a new policy entry, then updates the new policy entry into the host policy table in the host system, and simultaneously delivers the new policy entry to the network adapter policy table in the network adapter.

In this case, both the host policy table and the network adapter policy table include the policy entry that matches the protocol keyword of the uplink packet. Subsequently, after receiving a data packet whose protocol keyword is the same as that of the uplink packet, the network adapter may perform, according to the action in the policy entry newly added in the network adapter policy table or the host policy table, a corresponding protocol stack operation for the received data packet.

According to another aspect, after the host system updates the network adapter policy table and the host policy table, a CPU of the host system may be used to perform corresponding processing (such as TCP checksum calculation and GRO processing) for the uplink packet; and after the processing is complete, the CPU forwards the uplink packet to a protocol stack or a vSwitch for processing.

Figure 5:
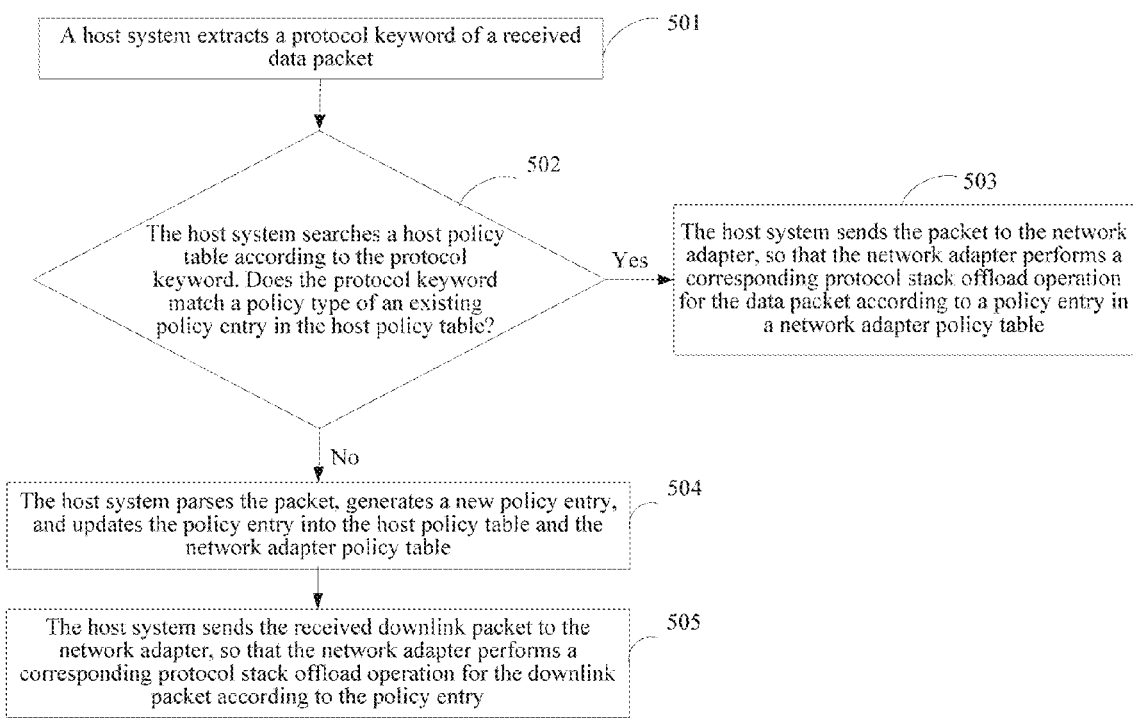
FIG. 5 is a flowchart of a method for implementing a network adapter offload function if a received packet is a downlink packet according to an embodiment of the present invention.

For another example, FIG. 5 shows a method for implementing a network adapter offload function if a received packet is a downlink packet according to this embodiment of the present invention. The method includes:

501. The host system extracts a protocol keyword of a received data packet.

After receiving a downlink packet delivered by a vSwitch or a protocol stack in the transmit (TX) direction, the host system extracts the protocol keyword of the downlink packet by using the local packet parsing module.

502. The host system searches the host policy table according to the protocol keyword, where the host policy table includes the policy entry, and the policy entry includes the policy type; if the protocol keyword matches a policy type of an existing policy entry in the host policy table, the data packet is a data packet known to the network adapter, and 503 is performed; otherwise, the data packet is a data packet unknown to the network adapter, and 504 is performed.

503. The host system sends the packet to the network adapter, so that the network adapter performs a corresponding protocol stack offload operation for the data packet according to a policy entry in the network adapter policy table.

If the protocol keyword of the data packet matches a policy type of an existing policy entry in the host policy table, as the host policy table and the network adapter policy table are updated simultaneously, it may be learned that a policy entry matching the keyword also exists in the network adapter policy table. In this case, the host system sends the received data packet to the network adapter, so that the network adapter performs a corresponding protocol stack offload operation for the data packet according to the action in the policy entry.

504. The host system parses the packet, generates a new policy entry, and updates the policy entry into the host policy table and the network adapter policy table.

If the protocol keyword of the data packet does not match a policy type of any existing policy entry in the host policy table, the local packet parsing module of the host system parses the received data packet and generates a new policy entry corresponding to a parsing result. The local packet parsing module of the host system updates the generated new policy entry into the host policy table and simultaneously delivers the policy entry to the network adapter policy table to implement synchronous update of the host policy table and the network adapter policy table. For specific steps, reference may be made to 103*a* to 103*c*, and therefore no further details are provided herein.

505. The host system sends the received downlink packet to the network adapter, so that the network adapter performs a corresponding protocol stack offload operation for the downlink packet according to the policy entry.

The host system sends the received downlink packet to the network adapter. As the new policy entry has been added into the policy table in the network adapter, the network adapter may perform the corresponding protocol stack offload operation for the downlink packet according to the action in the new policy entry and send the downlink packet to a network.

Figure 6:
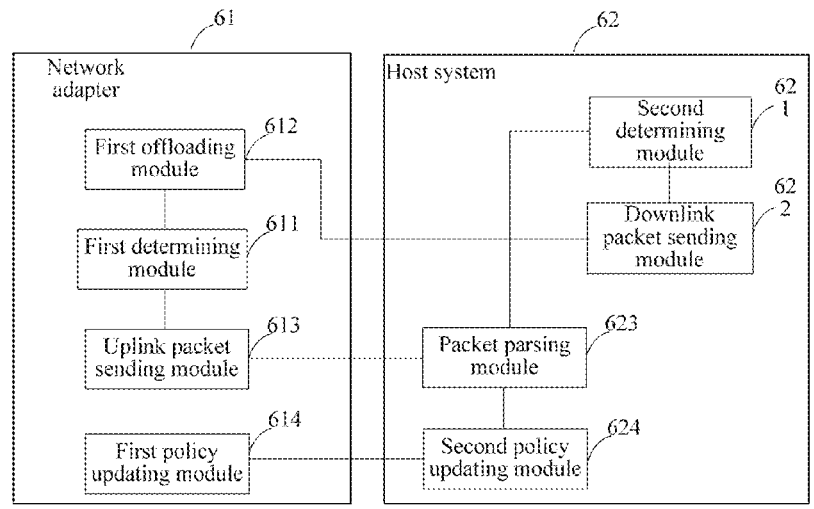
FIG. 6 is a block diagram of a network device for implementing a network adapter offload function according to an embodiment of the present invention.

FIG. 6 shows a block diagram of a network device for implementing a network adapter offload function according to an embodiment of the present invention, where the network device is configured to implement methods shown in FIG. 1, FIG. 4, and FIG. 5 in the present invention. The network device includes a network adapter 61 and a host system 62.

The network adapter 61 includes a memory, where the memory stores a network adapter policy table, the network adapter policy table includes a policy entry, and the policy entry includes a policy type and an action. The network adapter 61 may be connected to the host system 62. The network adapter 61 further includes a first determining module 611, a first offloading module 612, an uplink packet sending module 613, and a first policy updating module 614.

The first determining module 611 is configured to determine, according to the network adapter policy table, whether a received data packet is a data packet known to the network adapter or a data packet unknown to the network adapter.

The first offloading module 612 is configured to perform, if the data packet is a data packet known to the network adapter, a corresponding protocol stack offload operation for the data packet according to the network adapter policy table.

The uplink packet sending module 613 is configured to send, if the data packet is a data packet unknown to the network adapter, the data packet to the host system, so that the host system parses the data packet and generates a new policy entry.

The first policy updating module 614 is configured to receive the new policy entry and update the new policy entry into the network adapter policy table.

The first determining module 611 includes a keyword extracting unit and a table searching unit.

The keyword extracting unit is configured to extract a protocol keyword of the data packet.

The table searching unit is configured to search the network adapter policy table according to the protocol keyword extracted by the keyword extracting unit, where the network adapter policy table includes the policy entry, and the policy entry includes the policy type; if the protocol keyword matches a policy type of an existing policy entry in the network adapter policy table, the data packet is a data packet known to the network adapter; otherwise, the data packet is a data packet unknown to the network adapter.

The host system 62 stores a host policy table, where the host policy table includes a policy entry, and the policy entry includes a policy type and an action. The host system 62 includes a second determining module 621, a downlink packet sending module 622, a packet parsing module 623, and a second policy updating module 624.

The second determining module 621 is configured to determine, according to the host policy table, whether a received data packet is a data packet known to the network adapter or a data packet unknown to the network adapter.

The downlink packet sending module 622 is configured to send, if the data packet is a data packet known to the network adapter, the data packet to the network adapter, so that the network adapter performs a corresponding protocol stack offload operation for the data packet according to the policy entry in the network adapter policy table.

The packet parsing module 623 is configured to parse, if the received data packet is a data packet unknown to the network adapter, the data packet unknown to the network adapter and generate a new policy entry.

The second policy updating module 624 is configured to update the new policy entry into the host policy table and send the new policy entry to the network adapter.

The packet parsing module 623 may include a key field extracting unit, a key field matching unit, and a policy entry generating unit. Alternatively, it may include a packet forwarding unit and a policy entry receiving unit.

The key field extracting unit is configured to extract a protocol keyword of the data packet unknown to the network adapter.

The key field matching unit is configured to search a protocol parsing table according to the protocol keyword extracted by the key field extracting unit, where the protocol parsing table includes a protocol keyword and a handler of a protocol parsing function.

The policy entry generating unit is configured to acquire, if the protocol keyword matches a protocol keyword of a piece of existing protocol parsing information in the protocol parsing table, a handler of a protocol parsing function in the existing protocol parsing information, invoke the protocol parsing function to parse the data packet, and generate the new policy entry.

The packet forwarding unit is configured to forward the received data packet unknown to the network adapter to a remote server, so that the remote server parses the packet and generates the new policy entry.

The policy entry receiving unit is configured to receive the new policy entry.

It should be noted that policy tables in the host system and the network adapter initially may be empty, that is, there is no policy entry. As the network adapter continuously receives traffic packets of various protocol types, a local packet parsing module or a remote packet parsing module dynamically expands policy entries in the policy tables in the host system and the network adapter. The policy tables may be maintained by using a passive aging mechanism, that is, a LRU policy entry is overwritten when the number of policy entries exceeds an upper limit, thereby saving storage resources of the network adapter.

Figure 7:
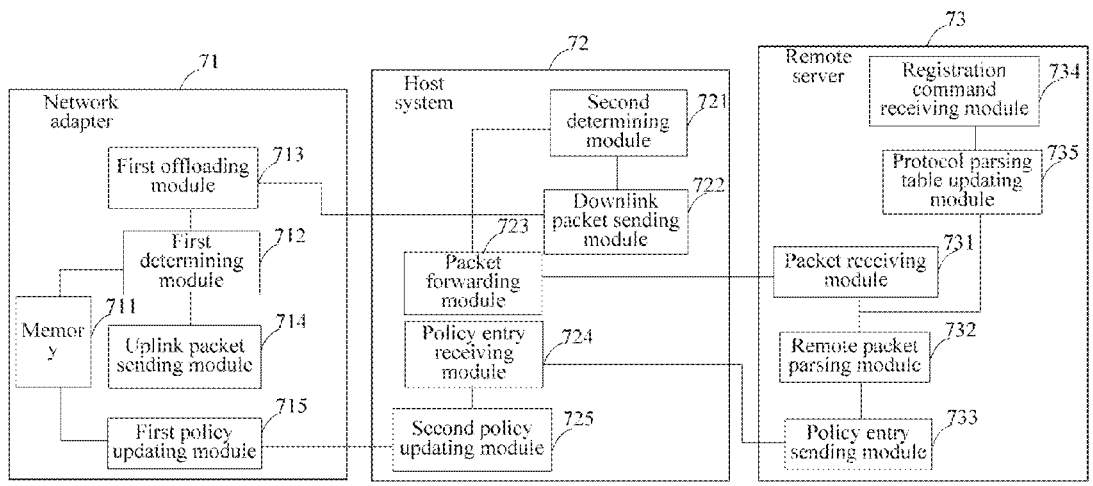
FIG. 7 is a block diagram of a system for implementing a network adapter offload function according to an embodiment of the present invention.

FIG. 7 shows a block diagram of a system for implementing a network adapter offload function according to an embodiment of the present invention, and only a part related to this embodiment of the present invention is shown. The system includes a network adapter 71, a host system 72, and a remote server 73.

The network adapter 71 includes a memory 711, where the memory 711 stores a network adapter policy table, the network adapter policy table includes a policy entry, and the policy entry includes a policy type and an action. The network adapter 71 is connected to the host system 72. The network adapter 71 further includes a first determining module 712, a first offloading module 713, an uplink packet sending module 714, and a first policy updating module 715.

The first determining module 712 is configured to determine, according to the network adapter policy table, whether a received data packet is a data packet known to the network adapter or a data packet unknown to the network adapter.

The first offloading module 713 is configured to perform, if the data packet is a data packet known to the network adapter, a corresponding protocol stack offload operation for the data packet according to the network adapter policy table.

The uplink packet sending module 714 is configured to send, if the data packet is a data packet unknown to the network adapter, the data packet to the host system, so that the host system parses the data packet and generates a new policy entry.

The first policy updating module 715 is configured to receive the new policy entry and update the new policy entry into the network adapter policy table.

The first determining module 712 includes a keyword extracting unit and a table searching unit.

The keyword extracting unit is configured to extract a protocol keyword of the data packet.

The table searching unit is configured to search the network adapter policy table or a host policy table according to the protocol keyword extracted by the keyword extracting unit, where the host policy table and the network adapter policy table include policy entries, and the policy entries include policy types. If the protocol keyword matches a policy type of an existing policy entry in the network adapter policy table, the data packet is a data packet known to the network adapter; otherwise, the data packet is a data packet unknown to the network adapter.

The host system 72 stores the host policy table, where the host policy table includes a policy entry, and the policy entry includes a policy type and an action. The host system 72 includes a second determining module 721, a downlink packet sending module 722, a packet forwarding module 723, a policy entry receiving module 724, and a second policy updating module 725.

The second determining module 721 is configured to determine, according to the host policy table, whether a received data packet is a data packet known to the network adapter or a data packet unknown to the network adapter.

The downlink packet sending module 722 is configured to send, if the data packet is a data packet known to the network adapter, the data packet to the network adapter, so that the network adapter performs a corresponding protocol stack offload operation for the data packet according to an existing policy entry in the network adapter policy table.

The packet forwarding module 723 is configured to forward the received data packet unknown to the network adapter to a remote server, so that the remote server parses the packet and generates a new policy entry.

The policy entry receiving module 724 is configured to receive the new policy entry.

The second policy updating module 725 is configured to update the new policy entry into the host policy table and send the new policy entry to the network adapter.

The remote server 73 stores a protocol parsing table, where the protocol parsing table includes a protocol header keyword and an entry that points to a parsing function handler corresponding to the protocol header keyword, and the protocol header keyword is an index of the protocol parsing table. The remote server 73 further includes a packet receiving module 731, a remote packet parsing module 732, a policy entry sending module 733, a registration command receiving module 734, and a protocol parsing table updating module 735.

The packet receiving module 731 is configured to receive the data packet that is unknown to the network adapter and sent by the host system 72.

The remote packet parsing module 732 is configured to parse the data packet that is unknown to the network adapter and received by the packet receiving module 731 and generate a new policy entry.

The policy entry sending module 733 is configured to send the new policy entry to the host system 72, so that the host system 72 simultaneously updates the new policy entry sent by the policy entry sending module 733 into the host policy table of the host system 72 and the network adapter policy table.

The remote packet parsing module 732 includes a key field extracting unit, a key field matching unit, and a policy entry generating unit.

The key field extracting unit is configured to extract a protocol keyword of the data packet unknown to the network adapter.

The key field matching unit is configured to search the protocol parsing table according to the keyword extracted by the key field extracting unit, where the protocol parsing table includes a protocol keyword and a handler of a protocol parsing function.

The policy entry generating unit is configured to acquire, if the protocol keyword matches a protocol keyword of a piece of existing protocol parsing information in the protocol parsing table, a handler of a protocol parsing function in the existing protocol parsing information, invoke the protocol parsing function to parse the data packet, and generate a policy entry corresponding to a parsing result.

The registration command receiving module 734 is configured to receive an entered new protocol registration command, where the new protocol registration command includes a keyword and an entry that points to a parsing function handler corresponding to the keyword.

The protocol parsing table updating module 735 is configured to update the protocol parsing table in the remote server 73 according to the new protocol registration command received by the registration command receiving module 734. In this embodiment of the present invention, in one aspect, a received data packet unknown to a network adapter is parsed, a policy entry corresponding to a parsing result is generated, and the policy entry is simultaneously updated into a host policy table and a network adapter policy table, so that the network adapter performs, according to the policy entry, a corresponding protocol stack offload operation for a subsequently received data packet of the same kind. For a packet that includes a new proprietary or standard protocol header Tag, only a functional module that parses the packet needs to be updated, so that the functional module is capable of processing such a packet and delivering a new policy entry to the host policy table or the network adapter policy table and the network adapter does not need to be changed, thereby implementing dynamic expansion for the network adapter offload function. In another aspect, the policy tables in the host system and the network adapter may be maintained by using a passive aging mechanism, that is, a LRU policy entry is overwritten when the number of policy entries exceeds an upper limit, thereby saving storage resources of the network adapter. In still another aspect, in this embodiment of the present invention, a packet parsing module is classified as a local packet parsing module and a remote packet parsing module. The remote packet parsing module provides a new protocol registration function, takes charge of parsing a packet, generating a policy entry, and sending the policy entry to the local packet parsing module, and forms a one-to-many service mode, thereby solving a problem that a processing overhead and management complexity increase due to that a new protocol needs to be registered with and parsed by a packet parsing module of each server when network adapters of the same kind are deployed in a wide range.

The foregoing describes only exemplary embodiments of the present invention and is not intended to limit the present invention. Any modification, equivalent replacement, or improvement made without departing from the spirit and principle of the present invention shall fall within the protection scope of the present invention.

What is claimed is:

1. A method for implementing a network adapter offload function by a network device that comprises a host system and a network adapter, the method comprising:

performing a data packet communication protocol determination to determine, according to a network adapter policy table stored in the network adapter or a host policy table stored in the host system, whether a data packet is a known data packet to the network adapter or an unknown data packet to the network adapter, wherein the network adapter policy table and the host policy table include policy entries, wherein each policy entry includes a policy type and an action, wherein the data packet is the known data packet when a communication protocol of the data packet matches a policy type of an existing policy entry in the network adapter policy table or the host policy table, wherein the data packet is the unknown data packet when the communication protocol of the data packet does not match a policy type of any existing policy entry in the network adapter policy table or the host policy table, wherein the data packet communication protocol determination is performed by the host system using the host policy table when the data packet is a downlink data packet, and wherein the data packet communication protocol determination is performed by the network adapter using the network adapter policy table when the data packet is an uplink data packet;

performing, by the network adapter and according to an action of the existing policy entry in the network adapter policy table, a corresponding protocol stack offload operation for the known data packet;

parsing the unknown data packet based on the determination that the communication protocol of the data packet is unknown to the network adapter;

generating a new policy entry for the communication protocol of the unknown data packet; and updating the new policy entry for the communication protocol of the unknown data packet into the host policy table and the network adapter policy table.

2. The method according to claim 1, wherein parsing the unknown data packet is performed by the host system.

3. The method according to claim 1, further comprising:
forwarding, by the host system, the unknown data packet to a remote server, wherein parsing the unknown data packet and generating the new policy entry is performed by the remote server; and
receiving, by the host system, the new policy entry returned by the remote server.

4. The method according to claim 1, wherein parsing the unknown data packet comprises:
extracting a protocol keyword of the unknown data packet;
searching a protocol parsing table according to the protocol keyword, wherein the protocol parsing table comprises a stored protocol keyword and a handler of a protocol parsing function;
acquiring the handler of the protocol parsing function in an existing protocol parsing information when the protocol keyword matches the stored protocol keyword of a piece of the existing protocol parsing information in the protocol parsing table; and
invoking the protocol parsing function to parse the unknown data packet when the protocol keyword matches the stored protocol keyword of the piece of the existing protocol parsing information in the protocol parsing table.

5. The method according to claim 1, wherein the data packet communication protocol determination comprises:
extracting, by the network adapter or the host system, a protocol keyword of the data packet; and
searching the network adapter policy table or the host policy table according to the protocol keyword.

6. A network adapter, comprising:
a memory comprising instructions; and
at least one processor coupled to the memory and configured to execute the instructions to:
perform a data packet communication protocol determination to determine, according to a network adapter policy table, whether a data packet is a known data packet to the network adapter or an unknown data packet to the network adapter, wherein the network adapter policy table includes policy entries, wherein each policy entry includes a policy type and an action, wherein the data packet is the known data packet when a communication protocol of the data packet matches a policy type of an existing policy entry in the network adapter policy table, wherein the data packet is the unknown data packet when the communication protocol of the data packet does not match a policy type of any existing policy entry in the network adapter policy table, and wherein the data packet is an uplink data packet;
perform a corresponding protocol stack offload operation for the known data packet according to an action of the existing policy entry in the network adapter policy table;
send, based on the determination that the data packet is the unknown data packet to the network adapter, the unknown data packet to a host system so that the host system parses the unknown data packet and generates a new policy entry for the communication protocol of the unknown data packet;
receive, from the host system, the new policy entry for the communication protocol of the unknown data packet; and
update the new policy entry for the communication protocol of the unknown data packet into the network adapter policy table.

7. The network adapter according to claim 6, wherein the data packet communication protocol determination comprises:
extracting a protocol keyword of the data packet; and
searching the network adapter policy table according to the protocol keyword.

8. A host system, comprising:
a memory comprising instructions; and
at least one processor coupled to the memory and configured to execute the instructions to:
perform a data packet communication protocol determination to determine, according to a host policy table, whether a data packet is a known data packet to a network adapter or an unknown data packet to the network adapter, wherein the host policy table includes policy entries, wherein each policy entry includes a policy type and an action, wherein the data packet is the known data packet when a communication protocol of the data packet matches a policy type of an existing policy entry in the host policy table, wherein the data packet is the unknown data packet when the communication protocol of the data packet does not match a policy type of any existing policy entry in the host policy table, and wherein the data packet is a downlink data packet;
send, based on the determination that the data packet is the known data packet to the network adapter, the known data packet to the network adapter so that the network adapter performs a corresponding protocol stack offload operation for the data packet according to a policy entry in a network adapter policy table;
parse, based on the determination that the data packet is an unknown data packet to the network adapter, the unknown data packet and generate a new policy entry for the communication protocol of the unknown data packet;
update the new policy entry for the communication protocol of the unknown data packet into the host policy table; and
send the new policy entry for the communication protocol of the unknown data packet to the network adapter, so that the network adapter updates the new policy entry for the communication protocol of the unknown data packet into the network adapter policy table.

9. The host system according to claim 8, wherein parsing the unknown data packet and generating the new policy entry comprises:
extracting a protocol keyword of the data packet unknown to the network adapter;
searching a protocol parsing table according to the protocol keyword, wherein the protocol parsing table comprises a protocol keyword and a handler of a protocol parsing function; and
acquiring a handler of a protocol parsing function in an existing protocol parsing information when the protocol keyword matches a stored protocol keyword of a piece of the existing protocol parsing information in the protocol parsing table;
invoking the protocol parsing function to parse the unknown data packet when the protocol keyword matches the stored protocol keyword of the piece of the existing protocol parsing information in the protocol parsing table; and generating the new policy entry when the protocol keyword matches the stored protocol keyword of the piece of the existing protocol parsing information in the protocol parsing table.

10. The host system according to claim 8, wherein parsing the unknown data packet comprises:
forwarding the unknown data packet to a remote server so that the remote server parses the unknown data packet and generates the new policy entry; and
receiving the new policy entry from the remote server.

11. A network device for implementing a network adapter offload function, comprising:
a network adapter comprising:
a first memory comprising instructions; and
at least a first processor coupled to the first memory and configured to execute the instructions to:
perform a data packet communication protocol determination to determine, according to a network adapter policy table, whether a data packet is a known data packet to the network adapter or an unknown data packet to the network adapter, wherein the network adapter policy table includes policy entries, wherein each policy entry includes a policy type and an action, wherein the data packet matches a policy type of an existing policy entry in the network adapter policy table, wherein the data packet is the unknown data packet when the communication protocol of the data packet does not match a policy type of any existing policy entry in the network adapter policy table, and wherein the data packet communication protocol determination is performed by the network adapter using the network adapter policy table when the data packet is an uplink data packet;
perform, based on the determination that the data packet is the known data packet to the network adapter, a corresponding protocol stack offload operation for the known data packet according to an action of the existing policy entry in the network adapter policy table;
send, based on the determination that the data packet is the unknown data packet to the network adapter, the unknown data packet to a host system so that the host system parses the unknown data packet and generates a new policy entry for the communication protocol of the unknown data packet;
receive the new policy entry for the communication protocol of the unknown data packet; and
update the new policy entry for the communication protocol of the unknown data packet into the network adapter policy table; and
a host system comprising:
a second memory comprising instructions; and
at least a second processor coupled to the second memory and configured to execute the instructions to:
perform the data packet communication protocol determination to determine, according to a host policy table, whether the data packet is a known data packet to a network adapter or an unknown data packet to the network adapter, wherein the host policy table includes policy entries, wherein each policy entry includes a policy type and an action, wherein the data packet is the known data packet when a communication protocol of the data packet matches a policy type of an existing policy entry in the host policy table, wherein the data packet is the unknown data packet when the communication protocol of the data packet does not match a policy type of any existing policy entry in the host policy table, and wherein the data packet communication protocol determination is performed by the host system using the host policy table when the data packet is a downlink data packet;
send, based on the determination that the data packet is the known data packet to the network adapter, the known data packet to the network adapter so that the network adapter performs a corresponding protocol stack offload operation for the known data packet according to the policy entry in the network adapter policy table;
parse, based on the determination that the data packet is the unknown data packet to the network adapter, the unknown data packet and generate the new policy entry for the communication protocol of the unknown data packet;
update the new policy entry for the communication protocol of the unknown data packet into the host policy table; and
send the new policy entry for the communication protocol of the unknown data packet to the network adapter, so that the network adapter updates the new policy entry for the communication protocol of the unknown data packet into the network adapter policy table.

12. The network device according to claim 11, wherein the data packet communication protocol determination comprises:
extracting a protocol keyword of the data packet; and
searching the network adapter policy table according to the protocol keyword extracted by the keyword extracting unit, wherein the network adapter policy table comprises the policy entry, wherein the policy entry comprises a policy type,
wherein the communication protocol of the data packet is known to the network adapter when the protocol keyword matches the policy type of an existing policy entry in the network adapter policy table, and
wherein the communication protocol of the data packet is unknown to the network adapter when the protocol keyword does not match the policy type of the existing policy entry in the network adapter policy table.

13. The network device according to claim 11, wherein parsing the unknown data packet and generating the new policy entry comprises:
extracting a protocol keyword of the unknown data packet;
searching a protocol parsing table according to the protocol keyword, wherein the protocol parsing table comprises a stored protocol keyword and a handler of a protocol parsing function;
acquiring the handler of the protocol parsing function in an existing protocol parsing information based on the determination that the protocol keyword matches a stored protocol keyword of a piece of the existing protocol parsing information in the protocol parsing table;
invoking the protocol parsing function to parse the unknown data packet based on the determination that the protocol keyword matches the stored protocol keyword of the piece of the existing protocol parsing information in the protocol parsing table; and
generating the new policy entry based on the determination that the protocol keyword matches the stored protocol keyword of the piece of the existing protocol parsing information in the protocol parsing table.

14. The network device according to claim 11, wherein parsing the unknown data packet and generating the new policy entry comprises:

forwarding the unknown data packet to a remote server so that the remote server parses the unknown data packet and generates the new policy entry; and receiving the new policy entry from the remote server.

15. A system for implementing a network adapter offload function, comprising:
a network adapter comprising:
a first memory comprising instructions; and
at least a first processor coupled to the first memory and configured to execute the instructions to:
perform a data packet communication protocol determination to determine, according to a network adapter policy table, whether a data packet is a known data packet to the network adapter or an unknown data packet to the network adapter wherein the data packet is the known data packet when a communication protocol of the data packet is known to the network adapter, wherein the data packet is the unknown data packet when the communication protocol of the data packet is unknown to the network adapter, and wherein the data packet communication protocol determination is performed by the network adapter using the network adapter policy table when the data packet is an uplink data packet;
perform, based on the determination that the data packet is the known data packet, a corresponding protocol stack offload operation for the known data packet according to the network adapter policy table;
send, based on the determination that the data packet is the unknown data packet, the unknown data packet to a host system so that the host system parses the unknown data packet and generates a new policy entry for the communication protocol of the unknown data packet;
receive the new policy entry for the communication protocol of the unknown data packet; and
update the new policy entry for the communication protocol of the unknown data packet into the network adapter policy table;
a host system comprising:
a second memory comprising instructions; and
at least a second processor coupled to the second memory and configured to execute the instructions to:
perform the data packet communication protocol determination to determine, according to a host policy table, whether the data packet is the known data packet to the network adapter or the unknown data packet to the network adapter, wherein the data packet communication protocol determination is performed by the host system using the host policy table when the data packet is a downlink data packet;
send, based on the determination that the data packet is the known data packet to the network adapter, the known data packet to the network adapter so that the network adapter performs a corresponding protocol stack offload operation for the known data packet according to a policy entry in a network adapter policy table;
parse, based on the determination that the data packet is the unknown data packet to the network adapter, the unknown data packet and generate the new policy entry for the communication protocol of the unknown data packet;
update the new policy entry for the communication protocol of the unknown data packet into the host policy table; and send the new policy entry for the communication protocol of the unknown data packet to the network adapter; and
a remote server comprising:
a third memory comprising instructions; and
at least a third processor coupled to the third memory and configured to execute the instructions to:
receive the unknown data packet from the host system;
parse the unknown data packet;
generate the new policy entry for the communication protocol of the unknown data packet;
send the new policy entry to the host system so that the host system simultaneously updates the new policy entry into the host policy table of the host system and the network adapter policy table;
receive an entered new protocol registration command, where the new protocol registration command comprises a keyword and an entry that points to a parsing function handler corresponding to the keyword; and
update the protocol parsing table in the remote server according to the new protocol registration command received by the registration command receiving module.

16. The system according to claim 15, wherein performing the data packet communication protocol determination comprises:
extracting a protocol keyword of the data packet; and
searching the network adapter policy table according to the protocol keyword,
wherein the network adapter policy table comprises policy entries,
wherein each policy entry includes a policy type and an action,
wherein the communication protocol of the data packet is known to the network adapter when the protocol keyword matches a policy type of an existing policy entry in the network adapter policy table, and
wherein the communication protocol of the data packet is unknown to the network adapter when the protocol keyword does not match a policy type of any existing policy entry in the network adapter policy table.

17. The system according to claim 15, wherein parsing the unknown data packet and generating the new policy entry comprises:
extracting a protocol keyword of the unknown data packet;
searching a protocol parsing table according to the protocol keyword, wherein the protocol parsing table comprises a stored protocol keyword and a handler of a protocol parsing function;
acquiring the handler of the protocol parsing function in an existing protocol parsing information when the protocol keyword matches the stored protocol keyword of the existing protocol parsing information in the protocol parsing table;
invoking the protocol parsing function to parse the unknown data packet when the protocol keyword matches the stored protocol keyword of the existing protocol parsing information in the protocol parsing table; and
generating the new policy entry when the protocol keyword matches the stored protocol keyword of the existing protocol parsing information in the protocol parsing table.

18. The system according to claim 15, wherein parsing the unknown data packet and generating the new policy entry comprises:

forwarding the data packet to the remote server so that the remote server parses the unknown data packet and generates the new policy entry; and receiving the new policy entry from the remote server.

19. The system according to claim 15, wherein parsing, by the remote server, the unknown data packet and generating the new policy entry comprises:

extracting a protocol keyword of the unknown data packet;

searching the protocol parsing table according to the protocol keyword, where the protocol parsing table includes a stored protocol keyword and a handler of a protocol parsing function;

acquiring the handler of the protocol parsing function in an existing protocol parsing information when the protocol keyword matches the stored protocol keyword of the existing protocol parsing information in the protocol parsing table;

invoking the protocol parsing function to parse the data packet; and generating the policy entry corresponding to a parsing result.

20. The method according to claim 1, wherein the data packet comprises a proprietary protocol tag.

* * * * *